No. 862,092. PATENTED JULY 30, 1907.
J. T. MOREHEAD.
MANUFACTURE OF PHOSPHORUS AND CALCIUM CARBID.
APPLICATION FILED OCT. 14, 1895.
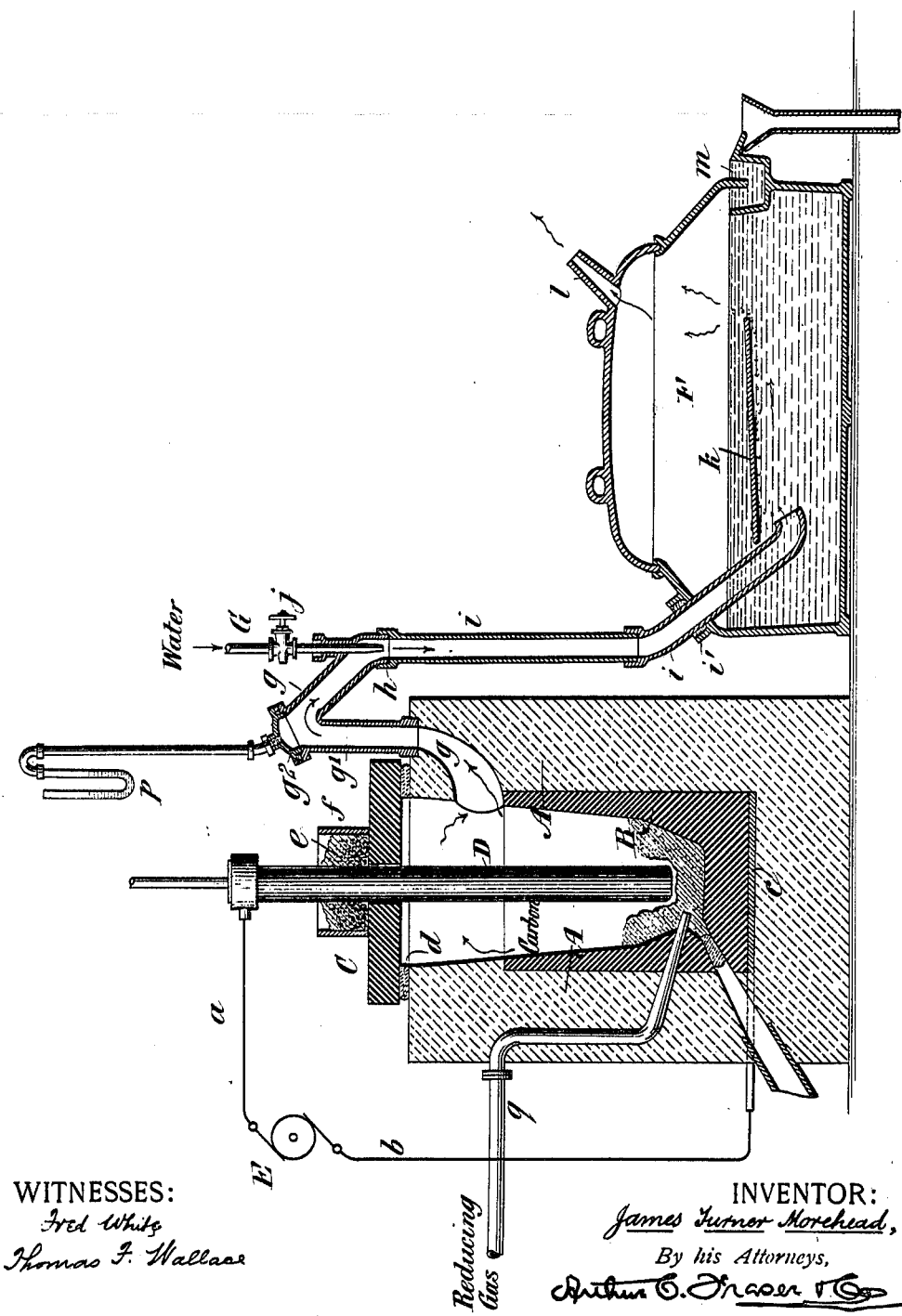
WITNESSES:
Fred White
Thomas F. Wallace
INVENTOR:
James Turner Morehead,
By his Attorneys,
Arthur E. Fraser

UNITED STATES PATENT OFFICE.

JAMES TURNER MOREHEAD, OF LEAKSVILLE, NORTH CAROLINA, ASSIGNOR, BY MESNE ASSIGNMENTS, TO WILLSON LABORATORY COMPANY, OF NEW YORK, N. Y., A CORPORATION OF WEST VIRGINIA.

MANUFACTURE OF PHOSPHORUS AND CALCIUM CARBID.

No. 862,092.      Specification of Letters Patent.      Patented July 30, 1907.

Application filed October 14, 1895. Serial No. 565,638.

*To all whom it may concern:*

Be it known that I, JAMES TURNER MOREHEAD, a citizen of the United States, residing at Leaksville, in the county of Rockingham and State of North Carolina, have invented certain new and useful Improvements in the Production of Phosphorus and Calcium Carbid, of which the following is a specification.

This invention provides an improved process for the production of phosphorus from a phosphate of a metallic base. It is distinguished by the formation of metallic carbids from the metallic bases of such phosphates, the phosphorus being reduced and driven off during the operation.

My invention provides a direct method of producing phosphorus at a single operation from calcined bones, phosphate rock, (for example phosphate of lime, phosphate of iron, and phosphate of alumina), or other phosphorus compounds.

According to my invention I place in a furnace or retort a phosphate of a metallic base (as calcined and ground bones or ground phosphate rock etc.) with a sufficient proportion of carbon to serve not only as a reducing agent for the phosphoric acid, but also to reduce the metallic oxid base, and subject the same to so high a degree of heat as to not only decompose and reduce the phosphate, but also to reduce the metallic oxid and produce a carbid of the metallic base. The phosphorus which is thus freed, distils over from the retort and is condensed by passing it under water in the usual manner. For attaining the requisite degree of heat, I use the heat generated by the electric arc, the retort being constructed as an electric furnace. The process thus becomes one of electric smelting. In practice, I may employ a phosphate rock consisting chiefly of tricalcic phosphate, and I employ powdered carbon and a hydrocarbon gas as the reducing agents, the resultants of the process being carbon monoxid which passes through the condenser and is burned, phosphorus which is arrested in the condenser, and calcium carbid which remains in the furnace, with also some by-products due to the presence of other ingredients in the phosphate rock than the mere tricalcic phosphate. Ordinary phosphate rock contains approximately:—

|   |   |   |   |
|---|---|---|---|
| 27 | per cent | phosphoric acid |   |
| 45 | " | " | lime |
| equal to 72 | " | " | tribasic phosphate of lime. |
| 9 | " | " | alumina |
| 4 | " | " | iron |
| 8.2 | " | " | water of absorption |
| 4.2 | " | " | water of combination |
| 7 or 8 | per cent | insoluble silicious matter. |   |

In practicing my process I take 100 pounds of such phosphate rock and add to it 55 pounds or thereabouts of carbon in the form of coke, charcoal, or any other suitable form, and I grind the two together to the consistency of a fine powder or flour. I may add 8 pounds or thereabouts of lime for the purpose of taking up the silicious matter in the phosphate rock, but this is not essential to my invention and may be omitted. I may also add a small proportion of finely ground sand or other form of silica if found desirable, in order to form a slag for eliminating any by-products, but this will be determined by the particular composition of the phosphate rock. These ingredients intimately mixed together are placed in the chamber, retort or crucible of an electric furnace, and the outlet or blow-hole thereof is connected by a tube to a condenser, so that the gaseous or vaporous matters discharged from the furnace are carried under water into a closed vessel, whereby the phosphorus which distils over may be condensed.

The carbon monoxid which passes over into the condenser bubbles up through the water and escapes through an outlet at the top, where it is preferably ignited. In addition a reducing gas, such as ordinary illuminating gas, or other hydrocarbon gas, is caused to flow through the furnace, its flow being commenced before the beginning of the smelting, to expel all air or oxygen. The electric smelting action is believed to be due primarily to the high degree of heat, and secondarily, to the presence of the carbon as a reducing agent which unites with the calcium by having a higher affinity therefor than the oxygen or phosphorus, whereby the calcium is converted into calcium carbid, and the phosphoric oxid which is disengaged is reduced freeing the phosphorus, which is vaporized and distils over. The operation is believed to be in accordance with the following equation:—

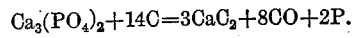

$$Ca_3(PO_4)_2 + 14C = 3CaC_2 + 8CO + 2P.$$

At the end of the run (assuming that the process is conducted intermittently) there remains in the furnace (1) calcium carbid; (2) iron combined with carbon or silicon; and (3) some impurities or residue in the nature of slag. When phosphate of alumina is used, one of the resulting products is aluminium carbid, which constitutes a valuable by-product of the process.

The accompanying drawing illustrates an apparatus which is well adapted for practicing my invention, and which to the best of my present knowledge and experience is the preferable one for the purpose.

The figure is a vertical longitudinal section through the apparatus, the electric circuit and dynamo being shown diagrammatically.

Let A designate the bench or brickwork of the furnace, B the crucible or hearth thereof made of carbon or graphite, C the carbon slab covering the furnace, D the carbon pencil constituting one of the electrodes, and E the dynamo by which the electric energy is generated. One terminal of the dynamo is connected by a wire $a$ with the carbon pencil D, and the other terminal is connected by a wire $b$ with a plate or slab $c$ beneath the carbon crucible B, and by which an extended surface of contact is obtained for the passage of the current from this plate to the crucible, so that the latter constitutes the other electrode. If a continuous current is employed, the carbon pencil should be the cathode, but I believe an alternating current to be preferable. To prevent the escape of gases or vapors from the furnace, a luting $d$ of fireclay is interposed between the cover C and the top of the bench, which luting also serves as an insulator. To prevent the escape of vapors through the opening in the cover, through which opening the pencil passes, and which opening must be so free as to permit of the easy adjustment of the pencil up or down for controlling the arc, I provide a sort of stuffing-box $e$, which consists of carbon in subdivided form which is piled upon the cover around the pencil. Preferably a circular wall or drum $f$ of iron, carbon, lime, fireclay or other refractory material is arranged to hold this mass of granulated carbon. Preferably coarse pieces of carbon are placed at the bottom and close around the pencil, finer fragments or granules of carbon are then placed upon these, and finally the whole is covered with carbon flour or finely ground carbon. This construction is sufficient in the absence of any material pressure in the chamber or retort of the furnace, to prevent the escape of vapors or gases therefrom. In place of the usual blow-hole for permitting the escape of gases and vapors, I provide a tubular outlet $g$ of some refractory material, such as fireclay or lime, which preferably terminates upwardly and is extended by a tube or neck of fireclay $g'$, which extends up and then down and is connected by a luted joint at $h$ with a tube $i$ preferably of earthenware, in one or more sections, which tube extends into the condenser F, being luted at $i'$ where it enters it so as to make a tight joint. These lutings are effected with clay or lime, or any other substance unaffected by carbon monoxid or phosphorus. The tube $g'$ has a removable cap $g^2$ to enable it to be cleaned out.

It is preferable that the pipe $i$ shall dip to a considerable depth beneath the water in the condenser F, which would have the effect of maintaining a considerable back pressure in the retort, and to avoid this, as well as to assist in the condensation of the phosphorus and the cooling of the hydrocarbon gases, I provide for showering water into the tube $i$ from a pipe G controlled by a valve $j$. By suitably adjusting this valve, the pressure can be so regulated as to exactly counterbalance the hydrostatic pressure in the condenser, so that the pressure shall be equal in the retort to the atmospheric pressure exterior thereto, as shown by the liquid gage $p$.

The reducing gas is introduced by a pipe $q$ from a generator or gas holder and is heated by passing through the furnace wall before being injected into the furnace chamber. In condenser F, the phosphorus which is condensed passes to the bottom of the water, and the uncondensed phosphorus in connection with the hydrocarbon gases is arrested by a submerged plate $k$, which may be of glass, earthenware or suitably coated metal, along which they must pass and continue in contact with the water until they reach its margin, when the gases bubble up and escape above the water, the phosphorus by this time having been entirely condensed. The gases pass out through a tube $l$ as usual, and are ignited and burn as they issue therefrom. In starting the operation the air originally in the condenser F above the water level should be displaced by filling it with carbonic acid gas, or otherwise, so that there can be no oxidation of any phosphorus which may float upon the water. The water which is continually admitted from the pipe G, together with any water which is displaced by the accumulation of the phosphorus, escapes by a sealed overflow, $m$.

The phosphorus which is condensed in the water is intermixed with some impurities, chiefly particles of unreduced phosphate and carbon, which are easily separated by fusing the phosphorus under water and pressing it out from the foreign matters, in the well known manner, and subsequently the phosphorus may be further purified by treatment with potassium dichromate and sulfuric acid as heretofore practiced.

It will be understood that this apparatus may be greatly varied without departing from the essential features of my invention. For example, I am not limited to the employment of a stream or shower of water entering the condenser, as this may be omitted. Nor am I limited to the means shown for packing or luting around the carbon pencil. The condenser F may be of any construction heretofore known for condensing phosphorus vapors.

The essentials of my process I believe to be the employment of a high degree of heat in connection with an abundant excess of a carbonaceous reducing agent, to combine with the calcium, or metallic base to form a metallic carbid, and this or some other equivalent reducing agent (as hydrogen) to combine with the oxygen of the phosphoric acid.

My process of electric smelting may be applied in the production of phosphorus from other compounds, such as phosphate of alumina.

The calcium or other metallic carbid produced by my process is a valuable by-product and may be used as a source of acetylene gas.

I am aware that processes have heretofore been patented for the manufacture of phosphorus by treating a phosphate with carbon in an electric furnace, and condensing the resulting phosphorus vapor. In such processes, however, there has been no production of a carbid of the metallic base of the phosphorus compound, the carbon employed being sufficient in quantity only for liberating the phosphorus from the phosphoric acid, and not being sufficient to reduce the calcium (or other) oxid to form a carbid. The result is that with the processes referred to the residue remaining in the furnace is a valueless slag, whereas in my process it is a valuable carbid. Hence my process is essentially distinguished from said previous processes by the employment of a greater proportion of carbon, in order not only to reduce the phosphoric acid, but also sufficient to combine with the oxygen of the metallic oxid, and also with the reduced metal to form a carbid therewith. The essential difference in the case of a tribasic calcium phosphate between my process and those heretofore patented, will be apparent upon a comparison of the equation hereinbefore given illustrating the reaction in my process, and the following equation which illustrates the reaction according to said previous processes, namely:—

$$Ca_3(PO_4)_2 + 5C = 3CaO + 5CO + 2P.$$

The calcium carbid produced by my process may contain calcium phosphid intimately combined therewith by the smelting operation, especially in case the carbon is insufficient and the smelting operation is not sufficiently prolonged. While ordinarily it is desirable to avoid the presence of such phosphid, yet a carbid containing such phosphid has certain properties which may render it desirable for certain uses. Such carbid containing phosphid, on being treated with water generates acetylene and hydrogen phosphid, and the latter ignites spontaneously, thus igniting the acetylene. As a possible use for such product I will suggest that in case it should become desirable to illuminate a distant point on a body of water at night, a cartridge or shell charged with this material might be fired from a gun under such conditions as to liberate the material on striking the water. The carbid would then instantly begin to generate acetylene gas, which would be ignited by the phosphid, and if the mass were made to float, the reaction would continue until all the carbid was decomposed, so that a brilliant illumination could be maintained for a considerable time, depending on the rapidity with which water were admitted to the carbid. Other uses for this new product will doubtless suggest themselves in course of time.

I claim as my invention the following defined novel features substantially as hereinbefore specified, namely:—

1. The process of producing phosphorus and a metallic carbid, which consists in subjecting to heat a phosphate of a metallic base with a reducing agent for the phosphoric acid and an abundant excess of carbon, the heat being sufficiently intense to set free phosphorus and to cause the metallic base to combine with carbon forming a metallic carbid.

2. The process of producing phosphorus and a metallic carbid, which consists in subjecting to electric smelting a phosphate of a metallic base with a reducing agent for the phosphoric acid and an abundant excess of carbon to combine with the metallic base, whereby phosphorus is set free and a metallic carbid is formed.

3. The process of producing phosphorus and a metallic carbid, which consists in subjecting to electric smelting in a closed chamber calcium phosphate with a reducing agent for the phosphoric acid and an abundant excess of carbon to combine with the calcium to form calcium carbid, and condensing the resultant vapors.

4. The process of producing phosphorus and a metallic carbid, which consists in subjecting calcium phosphate with carbon and lime to electric smelting in a closed chamber, the carbon being in sufficient proportion to combine with the calcium to form calcium carbid, and condensing the resultant vapors.

In witness whereof, I have hereunto signed my name in the presence of two subscribing witnesses.

JAMES TURNER MOREHEAD.

Witnesses:
JOHN A. WILSON,
G. C. CHALMERT.